Dec. 17, 1935.   C. S. GILLETTE ET AL   2,024,215
VIBRATIONPROOF PIPE JOINT
Filed March 20, 1934

INVENTORS
CLAUDE S. GILLETTE.
BY HENDERSON B. GREGORY.

Harold Dodd
ATTORNEY

Patented Dec. 17, 1935

2,024,215

UNITED STATES PATENT OFFICE 2,024,215

VIBRATION-PROOF PIPE JOINT

Claude S. Gillette, United States Navy, and Henderson B. Gregory, Washington, D. C.

Application March 20, 1934, Serial No. 716,510

1 Claim. (Cl. 285—122)

(Granted under the act of March 3, 1883, as amended April 30, 1928; 370 O. G. 757)

This invention relates to an improved vibration-proof pipe joint especially intended for making connection with extremely thin piping or tubing which is subject to the stress of vibration, such as on shipboard where there is generally a great deal of vibration present in the engine room and where it is nevertheless very desirable to use extremely thin piping or tubing so as to keep the total weight to a minimum.

Another object of this invention is to provide an improved pipe joint wherein a thin piping or tubing is welded, brazed, soldered, sweated or otherwise suitably secured to a sleeve member, which in turn carries a flanged nut member for adjustably and securely fastening the pipe to a thread placed on a fitting of usual thickness.

Figure 1:
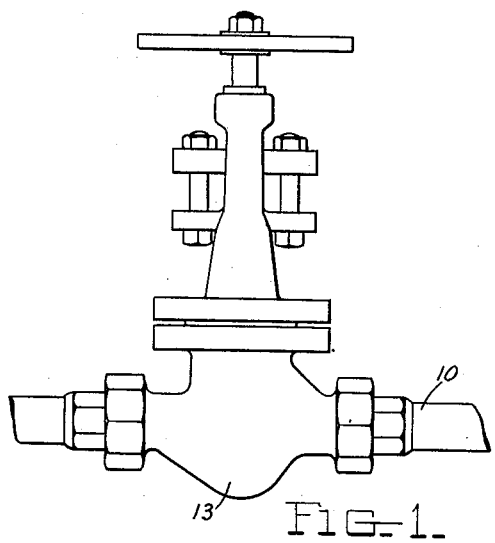
Fig. 1 is a plan view of a valve fitting using this joint for connection to the piping.
Figure 2:
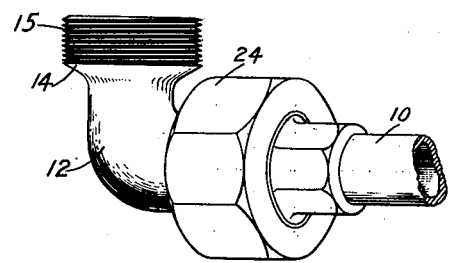
Fig. 2 is a perspective view of an elbow making use of this joint.
Figure 3:
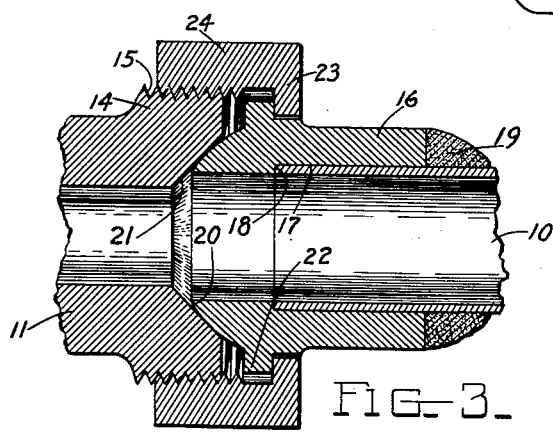
Fig. 3 is a sectional view through the joint or coupling.

There is shown at 10 the piping or tubing which is very desirable for use on board ship in that it is extremely thin, yet capable of withstanding the necessary pressure and vibratory stresses. It has been found, however, that while the thin tubing or piping 10 can withstand the necessary pressures, it can not stand having a thread cut into the ends thereof for the purpose of making joints with other fittings because the vibration always present on board ship soon weakens the tubing 10 at the thread, causing the failure of the pipe with attendant dangers, as when live steam or oil escapes therefrom. An obvious remedy would be to make the tubing 10 of thicker material but this would be uneconomical and disadvantageous in that it would greatly increase the total weight thereof which, in the case of a large ship, would amount to many tons.

At 11 is shown the end of a fitting which may be an elbow 12, a valve member 13, or any suitable fitting that is desired to be connected to tubing 10. The fitting 11 will, of course, be made of the usual thickness of material and terminates in a flanged end 14 threaded at 15. In order to adapt the piping or tubing 10 for connection with the threaded end 15 of fitting 11 without cutting threads on the tube, it is provided with a sleeve 16 which is of a substantial diameter and may be made of steel, bronze, brass or other suitable material. The internal diameter of sleeve 16 is increased as at 17, allowing the end of tubing 10 to be inserted into sleeve 16 as far as the shoulder 18. The end of tubing 10 is then welded, brazed, soldered, sweated or otherwise suitably secured to the sleeve 16, as at 19, by any suitable process, depending on the composition of the materials of which sleeve 16 and the pipe or tube 10 are made. The end 20 of sleeve 16 is semi-spherical so that it may properly be secured against the 45° socket 21 in the end of fitting 11. The sleeve 16 is provided with a flange 22 that cooperates with a flange 23 on a female nut 24. This nut 24 will draw the sleeve 16 with its secured tubing 10 tightly against the fitting 11.

Should sleeve 16 be slightly out of alignment with fitting 11, the semi-spherical seating on the end 20 of the sleeve 16 will adjust itself to a proper seating contact against the 45° socket 21 in the end of the fitting 11 as the nut 24 is tightened. The tubing 10, which is extremely thin, permitting such adjustment through very slight deformation or springing of the tubing 10 without injurious effect. As a result of this manner of making the joint, the tubing 10 is secured to fitting 11 without cutting any threads in the tubing and without in any way weakening it either as a result of the presence of such threads or as a result of its being deformed or sprung while being joined to the fitting. This is extremely desirable, especially on board ship, where the saving of weight in every possible manner is desired.

This invention may be manufactured and used by or for the Government of the United States of America for governmental purposes, without the payment of any royalties thereon.

We claim:

A vibration proof assembly for joining two extremely thin pipe sections together including a male member secured to one of said pipe sections, a female member secured to the other said pipe section, said male member having a semi-spherical end, said female member having a beveled end and means for forcing the semi-spherical end of the male member into tight contact with the beveled end of said female member.

C. S. GILLETTE.
HENDERSON B. GREGORY.